(12) United States Patent
Nakahira et al.

(10) Patent No.: US 10,915,212 B2
(45) Date of Patent: Feb. 9, 2021

(54) CONDUCTIVE FILM, CONDUCTIVE FILM HAVING THREE-DIMENSIONAL SHAPE, METHOD OF PRODUCING THE SAME, METHOD OF PRODUCING STRETCHED FILM, AND TOUCH SENSOR FILM

(71) Applicant: FUJIFILM Corporation, Tokyo (JP)

(72) Inventors: Shinichi Nakahira, Kanagawa (JP); Akihiro Ishii, Kanagawa (JP); Keisho Funatsu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/505,172

(22) Filed: Jul. 8, 2019

(65) Prior Publication Data

US 2019/0332225 A1    Oct. 31, 2019

Related U.S. Application Data

(63) Continuation of application No. PCT/JP2018/003045, filed on Jan. 30, 2018.

(30) Foreign Application Priority Data

Feb. 22, 2017 (JP) ................. 2017-031005

(51) Int. Cl.
*H01B 5/14*       (2006.01)
*H01B 13/00*     (2006.01)
*G06F 3/044*     (2006.01)

(52) U.S. Cl.
CPC ............ *G06F 3/0446* (2019.05); *H01B 5/14* (2013.01); *H01B 13/0016* (2013.01); *H01B 13/0036* (2013.01); *G06F 2203/04103* (2013.01); *G06F 2203/04112* (2013.01)

(58) Field of Classification Search
CPC ........ C09J 133/064; B29C 39/02; C09D 7/40; H01L 31/22
USPC .......................................... 200/600
See application file for complete search history.

(56) References Cited

U.S. PATENT DOCUMENTS

| 2012/0298497 A1* | 11/2012 | Maeda ................ C09J 133/064 200/600 |
| 2015/0234271 A1 | 8/2015 | Tokunaga et al. |
| 2018/0275317 A1 | 9/2018 | Shimode et al. |

(Continued)

FOREIGN PATENT DOCUMENTS

| JP | 2002-265538 A * | 9/2002 | ............. B29C 39/02 |
| JP | 2009-009860 A | 1/2009 | |
| JP | 2013-246741 A | 12/2013 | |

(Continued)

OTHER PUBLICATIONS

Office Action, issued by the Japanese Patent Office dated May 26, 2020, in connection with Japanese Patent Application No. 2019-501170.

(Continued)

*Primary Examiner* — Khanh T Nguyen
(74) *Attorney, Agent, or Firm* — Edwards Neils LLC; Jean C. Edwards, Esq.

(57) ABSTRACT

A conductive film has a support and a conductive portion which is disposed on the support and contains a conductive component and a binder, the binder contains a resin, a gel fraction of the resin is 70% or more, and a moisture content of the resin is 3% or less.

20 Claims, 2 Drawing Sheets

(56) References Cited

U.S. PATENT DOCUMENTS

2019/0043638 A1\* 2/2019 Akaike .................. C09D 7/40

FOREIGN PATENT DOCUMENTS

| | | |
|---|---|---|
| JP | 2014-006865 A | 1/2014 |
| JP | 2014-112512 A | 6/2014 |
| JP | 2014-119984 A | 6/2014 |
| JP | 2015-178595 A | 10/2015 |
| JP | 2016-027137 A | 2/2016 |
| JP | 2016-122517 A | 7/2016 |
| JP | 2016-136455 A | 7/2016 |
| WO | 2016/0208371 A1 | 12/2016 |
| WO | 2017/057640 A1 | 4/2017 |

OTHER PUBLICATIONS

Office Action, issued by the State Intellectual Property Office of China dated Mar. 10, 2020, in connection with Chinese Patent Application No. 201880007075.9.
International Search Report Issued in PCT/JP2018/003045 dated Apr. 3, 2018.
Written Opinion Issued in PCT/JP2018/003045 dated Apr. 3, 2018.
International Preliminary Report on Patentability Issued in PCT/JP2018/003045 dated Mar. 25, 2019.

\* cited by examiner

CONDUCTIVE FILM, CONDUCTIVE FILM HAVING THREE-DIMENSIONAL SHAPE, METHOD OF PRODUCING THE SAME, METHOD OF PRODUCING STRETCHED FILM, AND TOUCH SENSOR FILM

CROSS-REFERENCE TO RELATED APPLICATIONS

This application is a Continuation of PCT International Application No. PCT/JP2018/003045, filed on Jan. 30, 2018, which was published under PCT Article 21(2) in Japanese, and which claims priority under 35 U.S.C. § 119(a) to Japanese Patent Application No. 2017-031005, filed on Feb. 22, 2017. The above applications are hereby expressly incorporated by reference, in their entirety, into the present application.

BACKGROUND OF THE INVENTION

1. Field of the Invention

The present invention relates to a conductive member, and particularly, to a conductive film and a touch sensor film including a conductive film having a three-dimensional shape.

The invention also relates to a conductive film having a three-dimensional shape, a method of producing the conductive film having a three-dimensional shape, a stretched film, and a method of producing the stretched film.

2. Description of the Related Art

In electronic devices such as portable information devices, touch panels performing an input operation to the electronic device by touching a screen have been in widespread use in recent years.

Such touch panels include a touch sensor film, and the touch sensor film is formed of a conductive film in which a conductive portion is disposed on a substrate.

In recent years, various conductive films have been provided. For example, JP2014-112512A discloses a conductive sheet having a support and a conductive portion disposed on the support and containing metallic silver and a resin binder.

SUMMARY OF THE INVENTION

In order to further increase the operability of a device equipped with the touch panel described above, a touch panel having a three-dimensional shape in which a touch surface is a curved surface or the like has been proposed.

The inventors have found that in a case where the conductive film described in JP2014-112512A is deformed to impart a three-dimensional shape thereto, disconnection occurs in the conductive portion in the deformed conductive film, and thus conductivity is lowered.

In general, on a conductive portion in a conductive film having a three-dimensional shape, another layer such as a pressure sensitive adhesive layer is disposed in many cases, and the layer to be disposed adjacent to the conductive portion is required to have excellent adhesiveness.

In view of the above-described circumstances, an object of the invention is to provide a conductive film in which disconnection hardly occurs in a conductive portion even during deformation, and a layer such as a pressure sensitive adhesive layer which is disposed adjacent to the conductive portion has excellent adhesiveness.

Another object of the invention is to provide a method of producing a conductive film having a three-dimensional shape using the conductive film, a method of producing a stretched film, and a conductive film having a three-dimensional shape.

The inventors have intensively studied the above-described problems, and as a result, found that the problems can be solved by the following configuration.

(1) A conductive film comprising: a support; and a conductive portion which is disposed on the support and contains a conductive component and a binder, in which the binder contains a resin, a gel fraction of the resin is 70% or more, and a moisture content of the resin is 3% or less.

(2) The conductive film according to (1), in which the resin has a crosslinking structure.

(3) The conductive film according to (1) or (2), in which a ratio of a volume of the conductive component to a volume of the binder in the conductive portion is 0.2 to 2.0.

(4) The conductive film according to any one of (1) to (3), in which the resin is an acrylic or methacrylic resin.

(5) The conductive film according to any one of (1) to (4), in which the conductive portion is disposed on both surfaces of the support.

(6) The conductive film according to any one of (1) to (5), in which the support has a glass transition temperature of 120° C. or higher.

(7) The conductive film according to any one of (1) to (6), in which the support contains a cyclic olefin resin.

(8) The conductive film according to any one of (1) to (7), further comprising: a pressure sensitive adhesive layer which is disposed on the conductive portion.

(9) The conductive film according to (8), further comprising: a protective substrate which is disposed on the pressure sensitive adhesive layer.

(10) A method of producing a conductive film having a three-dimensional shape, comprising: a step X of deforming the conductive film according to any one of (1) to (9) to obtain a conductive film having a three-dimensional shape.

(11) The method of producing a conductive film having a three-dimensional shape according to (10), further comprising: a step Y of heating the conductive film at a temperature of 70° C. or higher before the step X.

(12) A method of producing a stretched film, comprising: a step Z of uniaxially or biaxially stretching the conductive film according to any one of (1) to (9) to obtain a stretched film.

(13) A touch sensor film comprising: a conductive film which is obtained by the method according to any one of (10) to (12).

(14) A conductive film having a three-dimensional shape comprising: a support having a three-dimensional shape; and a conductive portion which is disposed on the support and contains a conductive component and a binder, in which the binder contains a resin, a gel fraction of the resin is 70% or more, and a moisture content of the resin is 3% or less.

(15) The conductive film having a three-dimensional shape according to (14), in which the three-dimensional shape includes a curved surface.

(16) A touch sensor film comprising: the conductive film having a three-dimensional shape according to (14) or (15).

According to the invention, it is possible to provide a conductive member in which disconnection hardly occurs in a conductive portion even during deformation, and a layer such as a pressure sensitive adhesive layer which is disposed adjacent to the conductive portion has excellent adhesiveness.

According to the invention, it is also possible to provide a conductive film, a method of producing a conductive film having a three-dimensional shape using the conductive film, a method of producing a stretched film, and a conductive film having a three-dimensional shape.

DESCRIPTION OF THE PREFERRED EMBODIMENTS

Hereinafter, the invention will be described in detail. The following description of constituent requirements may be based on representative embodiments and specific examples, but the invention is not limited to the embodiments.

In this specification, a numerical value range expressed by using "to" means a range including numerical values described before and after "to" as a lower limit value and an upper limit value. The drawings of the invention are schematic views for making it easy to understand the invention, and the relationship between layers in thickness or position does not necessarily coincide with the actual one.

The term "(meth)acrylic" denotes "acrylic" or "methacrylic". The term "(meth)acrylate denotes acrylate or methacrylate. The term (meth)acryloyl group denotes an acryloyl group or a methacryloyl group.

A feature of a conductive member is that a conductive portion contains a resin having predetermined characteristics.

Hereinafter, preferable embodiments of the conductive member will be described with reference to the drawings.

Figure 1:
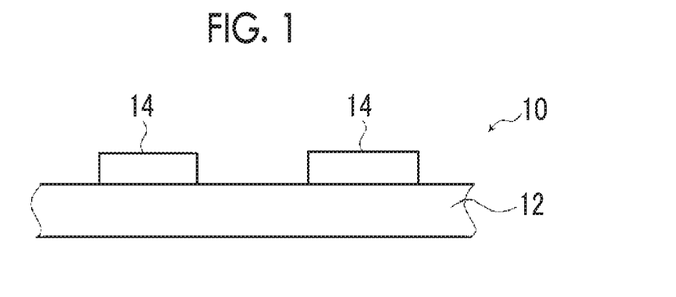
FIG. 1 is a cross-sectional view of a conductive member according to an embodiment.

FIG. 1 shows a cross-sectional view of a conductive member according to an embodiment. A conductive film 10 is provided with a support 12 and a conductive portion 14 having a shape of a plurality of thin wires (hereinafter, also referred to as conductive thin wires). In FIG. 1, the conductive portion has a thin wire shape. However, the shape is not limited thereto, and various patterns may be employed. A so-called solid film may be employed.

Hereinafter, the respective members of the conductive film 10 will be described in detail.

[Support]

The support is not limited as long as it can support the conductive portion, and an insulating support is preferable. As the support, a so-called flexible support is preferable, and an insulating flexible support is more preferable.

A resin is preferable as a material of the support. Examples of the resin include polyester resins such as polyethylene terephthalate (PET) and polyethylene naphthalate, polyolefin resins such as polyethylene (PE) and polypropylene (PP), vinyl resins such as polyvinyl chloride and polyvinylidene chloride, cyclic olefin resins, polyetheretherketone (PEEK), polysulfone (PSF), polyethersulfone (PES), polycarbonate (PC), polyamide, polyimide, acrylic resins, methacrylic resins, triacetyl cellulose (TAC), polystyrene, and ethylene-vinyl acetate (EVA).

Examples of the cyclic olefin resins include homopolymers containing only a cyclic olefin structural unit (also referred to as cycloolefin polymers (COP)), and copolymers of cyclic olefin structural units and other structural units (also referred to as cyclic olefin copolymers or cycloolefin copolymers (COC)).

In a case where a high transmitting property is required for the conductive film, the total visible light transmittance of the support is preferably 70% to 100%, more preferably 85% to 100%, and even more preferably 90% to 100%.

The material of the support is preferably PET, PC, or a cyclic olefin resin, and more preferably a cyclic olefin resin from the viewpoint of formability and workability.

The support may be colored.

The support can be used as a single layer, and can also be used as a laminate having a combination of two or more layers.

The thickness of the support is not particularly limited. In general, the thickness can be optionally selected within a range of 5 to 500 μm in view of application to a touch sensor film or an electromagnetic shield. The support can also be designed to have a thickness greater than 500 μm in a case where the support has a touch surface function as well as a support function.

An undercoat layer may be further disposed on the surface of the support. By forming a photosensitive layer on the undercoat layer, the adhesiveness of the conductive portion to be described later is further improved.

The material of the undercoat layer is not particularly limited. Examples thereof include a resin having predetermined characteristics (gel fraction and moisture content).

The method of forming the undercoat layer is not particularly limited. Examples thereof include a method including applying an undercoat layer forming composition on a support and optionally performing a heating treatment.

The thickness of the undercoat layer is not particularly limited. The thickness is preferably 0.02 to 5 μm, and more preferably 0.03 to 3 μm in view of more excellent adhesiveness of the conductive portion.

[Conductive Thin Wires]

The conductive thin wires are a thin wire-like conductive portion, and provided on the support. The conductive thin wire contains a conductive component and a binder. In FIG. 1, the conductive thin wires 14 are disposed only on one surface of the support 12. However, the invention is not limited to this form. As in another aspect of the conductive member shown in FIG. 4, conductive thin wires 14 may be disposed on both surfaces of the support 12. That is, the conductive portion may be disposed on both surfaces of the support.

The number of the conductive thin wires 14 is not particularly limited.

The line width of the conductive thin wire is not particularly limited, and preferably 30 μm or less, more preferably 15 μm or less, even more preferably 10 μm or less, particularly preferably 9 μm or less, and most preferably 7 μm or less as upper limit. In addition, the width is preferably 0.5 μm or more, and more preferably 1.0 μm or more as lower limit. In a case where the width is within the above range, the conductive thin wire can be suitably used as a low-resistance electrode.

The thickness of the conductive thin wire is not particularly limited, and preferably 0.01 to 20 μm, more preferably 0.01 to 10 µm, even more preferably 0.01 to 5 µm, and particularly preferably 0.5 to 2 µm. In a case where the thickness is within the above range, a low-resistance electrode having excellent visibility can be formed.

The conductive thin wire may form a predetermined pattern. For example, the pattern is not particularly limited, and preferably has a shape of a triangle such as an equilateral triangle, an isosceles triangle, or a right triangle, a quadrangle (for example, a square, a rectangle, a rhombus, a parallelogram, or a trapezoid), a (regular) n-polygon such as a (regular) hexagon or a (regular) octagon, a circle, an ellipse, a star, or a geometric figure as a combination of the above shapes. The pattern more preferably has a mesh shape (mesh pattern).

Figure 2:
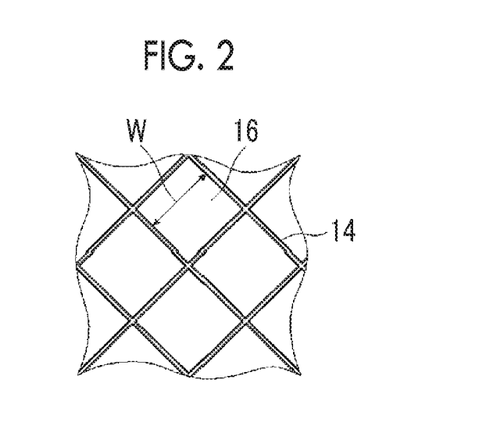
FIG. 2 is a plan view showing a conductive portion formed by conductive thin wires according to an embodiment.

Examples of the mesh shape include, a shape including a plurality of openings 16 formed by intersecting conductive thin wires 14 as shown in FIG. 2. A length W of one side of the opening 16 is not particularly limited, and preferably 1,500 µm or less, more preferably 1,300 µm or less, and even more preferably 1,000 µm or less as upper limit. In addition, the length W is preferably 5 µm or more, more preferably 30 µm or more, and even more preferably 80 µm or more as lower limit.

In a case where the length of one side of the opening is within the above range, the transparency of the conductive film is further improved.

In FIG. 2, the opening 16 has a substantially rhombus shape, but may have another shape. For example, it may have a polygonal shape (for example, a triangle, a quadrangle, a hexagon, or a random polygon). Furthermore, the shape of one side may be a curved shape or an arc shape other than a linear shape. In a case of an arc shape, for example, two opposing sides may have an outwardly convex arc shape, and other two opposing sides may have an inwardly convex arc shape. Each side may have a wavy line shape in which outward convex arcs and inward convex arcs continue. Each side may have a sine curve shape.

From the viewpoint of visible light transmittance, the opening ratio of the mesh pattern formed by the conductive thin wires is preferably 85% or more, more preferably 90% or more, and even more preferably 95% or more. The opening ratio corresponds to a ratio of an area on the support excluding an area having the conductive thin wires to a total area.

The conductive thin wire contains a conductive component. The shape of the conductive component is not particularly limited, and examples thereof include a particle shape. That is, the conductive component may be conductive particles.

The material of the conductive component is not particularly limited, and examples thereof include metals. Examples of the metals include silver, copper, nickel, palladium, gold, platinum, and tin, and gold, silver, or copper is preferable. Examples of the conductive component other than the metals include graphene, conductive polymers, and indium tin oxides (ITO).

In a case where the conductive component is fine particles, fine particles having an anisotropic shape such as a fibrous shape or a flat plate shape can also be preferably used in view of a further improvement in conductivity of the conductive portion.

The conductive component is preferably fine particles since it is possible to suppress the occurrence of disconnection of the conductive thin wire in deforming the conductive film due to a small coarse and fine distribution of the fine particles in the conductive thin wire.

The conductive thin wire contains a binder.

The binder denotes a component other than the conductive component in the conductive thin wire.

The binder contains a resin (polymer), and in general, the resin constitutes a main component of the binder. The main component denotes that a ratio of the resin is 80 mass % or more with respect to a total binder mass, and the ratio is preferably 90 mass % or more, and more preferably 95 mass % or more. Examples of components other than the resin include functional components such as a dispersant, a surfactant, an ultraviolet absorber, an antifoaming agent, and an antioxidant. The content of the functional components is not particularly limited. In many cases, the content is 1 mass % or more and less than 5 mass % with respect to the total binder mass.

The gel fraction of the resin is 70% or more, preferably 80% or more, more preferably 90% or more, and even more preferably 95% or more. The upper limit thereof is not particularly limited. The upper limit is 99% or less in many cases, and 98% or less in more cases.

In a case where the gel fraction of the resin is within the above range, it is possible to suppress the disconnection of the conductive thin wire in deforming (particularly, stretching) the conductive film. It has been predicted that as a characteristic of the resin required for suppressing the disconnection of the conductive thin wire, it is important to make the resin itself less likely to break in stretching the conductive film. However, as a result of the intensive studies of the inventors, it has been surprisingly found that a high gel fraction of the resin is more important than the ease of breakage of the resin itself, and the inventors have completed the invention. That is, it has been found that in a case where the resin is hard to break, but has a low gel fraction, the disconnection of the conductive thin wire easily occurs, and in a case where the resin is relatively easy to break, but the gel fraction of the resin is set to be high, the disconnection of the conductive thin wire hardly occurs. The reason is not clear why the disconnection of the conductive thin wire easily occurs in a case where the gel fraction of the resin is low but presumed to be that during stretching of the conductive film, the resin is preferentially locally deformed (particularly, stretched) at a portion where the gel fraction is low, and as a result, disconnection easily occurs.

The gel fraction is measured according to the following procedure.

A resin sample (about 100 mg) as a measurement target is prepared, and vacuum-dried at 25° C. for 24 hours. The resin after the drying is wrapped in a 400-mesh stainless steel wire mesh whose mass is measured in advance, and a mass Wa of the resin after the drying is obtained.

Next, the resin wrapped in the stainless steel wire mesh is left in 5 ml of ethyl acetate at 25° C. for 72 hours to extract the dissolved component. Thereafter, the resin is taken therefrom and repeatedly washed two times by adding 5 ml of ethyl acetate. Then, the washed resin is dried at 25° C. for 24 hours, and a mass Wb of the resin after the drying is measured. A gel fraction Rg (%) is calculated by the following expression.

$Rg = (Wb/Wa) = 100$

In a case where a latex containing a resin and a dispersant is used in producing a conductive thin wire (so-called conductive portion) as will be described later, a sample obtained using the latex is used as a target for measurement of the gel fraction. More specifically, for example, the latex is applied on a peelable base to form a coating film, and a drying treatment is optionally performed to use the obtained film as a measurement target. In a case where the gel fraction of the resin is within the above range, the breaking elongation of the resin is not limited. Especially, in a case where the breaking elongation is extremely low, disconnection may occur due to cracks of the resin itself. Therefore, the breaking elongation of the resin is preferably 20% or more. The upper limit value thereof is not particularly limited, and 300% or less in many cases.

The breaking elongation is measured according to the following procedure.

A resin film (length 70 mm, width 5 mm, film thickness 100 μm) as a measurement target is prepared, and a tensile test is performed using the obtained film with a precision universal testing machine AUTOGRAPH AGX-S (manufactured by Shimadzu Corporation) to obtain a breaking elongation. The tensile test is performed under conditions of an interchuck distance of 50 mm, a tensile speed of 5 mm/min, and a sample temperature of 180° C.

The method of producing the resin film is not particularly limited, and examples thereof include a method including applying a resin on a peelable base to form a coating film and optionally performing a drying treatment.

In a case where a latex containing a resin and a dispersant is used in producing a conductive thin wire (so-called conductive portion) as described above, a sample obtained using the latex is used as a target for measurement of the breaking elongation.

In a case where the gel fraction of the resin is within the above range, the hardness (modulus of elasticity) of the resin is not limited. Especially, in view of suppression of poor adhesion due to the occurrence of wrinkles during deformation and the difference from other layers in degree of stretching, and suppression of the occurrence of unintended deformation or blocking, the storage elastic modulus of the resin at 180° C. is preferably 0.05 to 100 MPa, and more preferably 0.08 to 1 MPa.

The storage elastic modulus is measured according to the following procedure.

First, a resin film (film thickness: 40 to 60 μm) as a measurement target is produced. Next, using the obtained film, measurement is performed under conditions of a tensile mode, a temperature of 50° C. to 200° C., and a measurement frequency of 1 Hz with a DVA-225 viscoelasticity testing machine manufactured by IT KEISOKU SEIGYO CO., LTD., and a value of the storage elastic modulus at 180° C. is read.

In a case where a latex containing a resin and a dispersant is used in producing a conductive thin wire (so-called conductive portion) as described above, a sample obtained using the latex is used as a target for measurement of the storage elastic modulus.

It is desirable that the breaking elongation and the storage elastic modulus are within the above ranges, respectively, within a preferable deformation temperature range of the conductive film to be described later.

The moisture content of the resin is 3% or less. In view of more excellent adhesiveness of a layer (for example, pressure sensitive adhesive layer) adjacent to the conductive portion in the conductive film, the moisture content is preferably 2.5% or less, more preferably 2% or less, and even more preferably 1.5% or less. The lower limit thereof is not particularly limited, and may be 0%.

The method of measuring the moisture content of the resin is as follows: first, a resin film (film thickness: 50 μm) as a measurement target is produced, the obtained film is kept for 24 hours under an environment of a temperature of 23° C. and a relative humidity of 50% RH, and then the moisture content of the resin is measured using a Karl Fischer moisture meter (Karl Fisher moisture meter MKC-610 and moisture vaporizer ADP611 manufactured by KYOTO ELECTRONICS MANUFACTURING CO., LTD.).

In a case where a latex containing a resin and a dispersant is used in producing a conductive thin wire (so-called conductive portion) as described above, a sample obtained using the latex is used as a target for measurement of the moisture content.

The glass transition temperature of the resin is not particularly limited, and preferably 70° C. or lower, and more preferably 50° C. or lower. In a case where the glass transition temperature is within the above range, the stretchability of the conductive film is further improved. In a case where a conductive portion is formed using a latex-containing composition as will be described later, a latex film is easily formed during heating, and a conductive portion having excellent transparency is easily obtained.

The lower limit of the glass transition temperature of the resin is not particularly limited, and preferably 10° C. or higher in view of handleability.

The weight-average molecular weight of the resin is not particularly limited, and preferably 100,000 to 10,000,000, and more preferably 500,000 to 5,000,000.

The type of the resin is not particularly limited as long as the gel fraction and the moisture content described above are within the predetermined ranges, respectively. For example, any of thermoplastic resins such as polyester resins, (meth) acrylic resins, polyolefin resins, polystyrene resins, and polyamide resins, and thermosetting resins such as polyester-melamine resins, melamine resins, epoxy-melamine resins, phenolic resins, epoxy resins, amino resins, and polyimide resins can be used.

Among these, acrylic resins or methacrylic resins ((meth) acrylic resins) are preferable in view of easy synthesis of a resin having predetermined characteristics and excellent handleability.

The (meth)acrylic resins denote resins in which the repeating unit derived from a (meth)acrylate monomer is contained in an amount more than 50 mass % with respect to all repeating units. The (meth)acrylic resins may contain other repeating units in addition to the repeating unit derived from the (meth)acrylate monomer. The (meth)acrylate monomer is a monomer having a (meth)acryloyl group.

The resin preferably has a crosslinking structure in order to control the gel fraction within the scope of the invention. The method of introducing a crosslinking structure into the resin is not particularly limited, and examples thereof include a method of producing a resin using a polyfunctional monomer, and a method of introducing a crosslinkable group into a resin to form crosslinking in the resin. A silane coupling agent may be optionally used in forming crosslinking in the resin.

Examples of the polyfunctional monomer include monomers having two or more ethylenically unsaturated groups in one molecule, such as divinylbenzene, allyl (meth)acrylate, ethylene glycol di(meth)acrylate, diethylene glycol di(meth) acrylate, polyethylene glycol di(meth)acrylate, and trimethylolpropane tri(meth)acrylate.

As the method of introducing a crosslinkable group into a resin, there is a method of producing a resin using a monomer having a crosslinkable group. Specific examples of the monomer having a crosslinkable group include amide group-containing monomers such as acrylamide, methacrylamide, N-methylol (meth)acrylamide, N-methoxymethyl (meth)acrylamide, N-butoxymethyl (meth)acrylamide, and diacetone (meth)acrylamide; amino group-containing monomers such as dimethylaminoethyl (meth)acrylate and diethylaminoethyl (meth)acrylate; alkoxy group-containing monomers such as methoxyethyl (meth)acrylate and butoxyethyl (meth)acrylate; glycidyl group-containing monomers such as glycidyl acrylate, glycidyl methacrylate, and glycidyl allyl ether; and silane monomers having a hydrolysable alkoxy group such as vinyltrimethoxysilane, vinyltriethoxysilane, (meth)acryloyloxyalkyltrimethoxysilane, and acryloxytrimethoxysilane. Among these, silane monomers are preferably used in view of the fact that since these have excellent crosslinking efficiency, the gel fraction is easily increased.

The resin preferably contains a repeating unit represented by Formula (1). In a case where the resin contains a repeating unit represented by Formula (1), a crosslinking structure is introduced into the resin, and the glass transition temperature and the gel fraction rise.

Formula (1)

In Formula (1), $R^1$ and $R^2$ each independently represent a hydrogen atom or an alkyl group. The number of carbon atoms in the alkyl group is not particularly limited, and preferably 1 to 3, and more preferably 1.

Each $L^1$ independently represents a single bond, an ester group (—COO—), an amide group (—CONH—), or a phenylene group. $L^1$ is preferably an ester group.

$L^2$ represents a divalent linking group. The type of the divalent linking group is not particularly limited, and examples thereof include a divalent hydrocarbon group (which may be a divalent saturated hydrocarbon group or a divalent aromatic hydrocarbon group. In a case of a divalent saturated hydrocarbon group, the divalent hydrocarbon group may be linear, branched, or cyclic, and preferably has 1 to 20 carbon atoms, and examples thereof include an alkylene group. In a case of a divalent aromatic hydrocarbon group, the divalent hydrocarbon group preferably has 6 to 20 carbon atoms, and examples thereof include a phenylene group. Besides, it may be an alkenylene group or an alkynylene group.), a divalent heterocyclic group, —O—, —S—, —SO$_2$—, —NR$_L$—, —C(=O)—, —C(=O)O—, —C(=O)NR$_L$—, —SO$_3$—, —SO$_2$NR$_L$—, and a group having a combination of two or more thereof (for example, an alkyleneoxy group, an alkyleneoxycarbonyl group, and an alkylenecarbonyloxy group). Here, $R_L$ represents a hydrogen atom or an alkyl group (preferably having 1 to 10 carbon atoms).

The content of the repeating unit represented by Formula (1) is not particularly limited, and preferably 0.1 to 10 mass %, and more preferably 0.2 to 5 mass % with respect to all repeating units contained in the resin in view of the fact that a resin having predetermined characteristics is easily obtained.

The resin preferably contains a repeating unit represented by Formula (2).

Formula (2)

In Formula (2), $R^3$ represents a hydrogen atom, an alkyl group, a halogen atom, or —CH$_2$COOR$^{10}$. The number of carbon atoms in the alkyl group is not particularly limited, and preferably 1 to 3, and more preferably 1. $R^{10}$ represents a hydrogen atom or an alkyl group having 1 to 80 carbon atoms.

$R^4$ represents an alkyl group, an alkenyl group or an alkynyl group. The number of carbon atoms contained in $R^{10}$ is not particularly limited, and preferably 1 to 80, more preferably 1 to 50, even more preferably 1 to 30, and particularly preferably 1 to 20.

As the repeating unit represented by Formula (2), only one type may be used, or two or more types may be used in combination. For example, a repeating unit in which $R^4$ represents an alkyl group, an alkenyl group or an alkynyl group having 1 to 3 carbon atoms, and a repeating unit in which $R^4$ represents an alkyl group, an alkenyl group or an alkynyl group having 4 to 80 carbon atoms are preferably used in combination.

The content of the repeating unit represented by Formula (2) is not particularly limited, and preferably 0.5 to 95 mass % with respect to all repeating units contained in the resin.

The resin may contain a repeating unit represented by Formula (3) and/or a repeating unit represented by Formula (4).

Formula (3)

Formula (4)

In Formula (3). $R^5$ represents a methyl group or a halogen atom. Among these, a methyl group, a chlorine atom, or a bromine atom is preferable. p represents an integer of 0 to 2, preferably 0 or 1, and more preferably 0.

In Formula (4), $R^6$ represents a hydrogen atom or a methyl group, and preferably a hydrogen atom.

q represents 0 or 1, and preferably 0.

$L^3$ represents a divalent linking group, and preferably a group represented by Formula (5).

Formula (5):

In Formula (5). $X^1$ represents an oxygen atom or —NR$^{11}$—. Here, $R^{11}$ represents a hydrogen atom, an alkyl group, an aryl group, or an acyl group, and each may have a substituent. A hydrogen atom, an alkyl group having 1 to 10 carbon atoms, or an acyl group is preferable as $R^{11}$. An oxygen atom or —NH— is preferable as $X^1$.

$X^2$ represents an alkylene group, an arylene group, an alkylene arylene group, an arylene alkylene group, or an alkylene arylene alkylene group. —O—, —S—, —OCO—, —CO—, —COO—, —NH—, —SO$_2$—, —N($R^{12}$)—, —N($R^{12}$)SO$_2$—, or the like may be inserted into the above groups. $R^{12}$ represents a linear or branched alkyl group having 1 to 6 carbon atoms, r represents 0 or 1.

The content of the repeating unit represented by Formula (3) is not particularly limited, and preferably 3 to 60 mass %, more preferably 3 to 50 mass %, and even more preferably 3 to 40 mass % with respect to all repeating units contained in the resin.

The content of the repeating unit represented by Formula (4) is not particularly limited, and preferably 0.5 to 25 mass %, more preferably 0.5 to 20 mass %, and even more preferably 1 to 20 mass % with respect to all repeating units contained in the resin.

The resin may contain a repeating unit (for example, a repeating unit having a hydroxyl group) other than the above-described repeating unit.

The resin can be synthesized with reference to, for example, JP3305459B, JP3754745B, and the like.

In producing a latex in which the resin is dispersed in the form of particles in water, a general emulsion polymerization method or a suspension polymerization method can be employed.

The ratio of the volume of the conductive component to the volume of the binder (volume of conductive component/volume of binder) in the conductive thin wire (corresponding to the conductive portion) is not particularly limited, and preferably 0.1 or more, more preferably 0.2 or more, even more preferably 0.3 or more, and particularly preferably 0.5 or more in view of more excellent conductivity of the conductive thin wire. The upper limit thereof is not particularly limited, and preferably 4.0 or less, more preferably 2.0 or less, even more preferably 1.5 or less, and particularly preferably 1.0 or less in view of stretchability of the conductive thin wire. In a case where the conductive film includes a portion not stretched or a portion having a low degree of stretching in accordance with the stretched shape of the conductive film, the above ratio (volume of conductive component/volume of binder) may be 4 or more in the corresponding conductive thin wire in the conductive film.

The method of measuring the volume of the binder and the volume of the conductive component is not particularly limited, and the volumes can be obtained as follows. First, an area ratio of the conductive thin wires on the support is obtained by observation with an optical microscope. Next, an amount of the conductive component applied on the support is obtained, and the obtained numerical value is divided by the area ratio of the conductive thin wires obtained previously to obtain an amount (g/m$^2$) of the conductive component applied in the conductive thin wire portion. The obtained numerical value is divided by a density of the conductive component to obtain a volume (m/m$^2$) of the conductive component in the conductive thin wires. At this time, the method of measuring the amount of the conductive component applied is not particularly limited, and in a case where the conductive component is a metal, fluorescent X-ray analysis is preferably used. In a case where the support has conductive thin wires on both surfaces thereof, the amount of the conductive component applied is calculated for each surface after removing of the conductive thin wires on one surface by etching and film removing.

Next, a thickness of the conductive thin wire is obtained, and a volume (m$^3$/m$^2$) of the conductive thin wires corresponding to a total volume of the binder and the conductive component is obtained.

The volume of the conductive component is subtracted from the obtained volume of the conductive thin wires to calculate a volume (m$^3$/m$^2$) of the binder, and the ratio (volume of conductive component/volume of binder) is obtained.

Any measuring device can be used for measurement of the thickness of the conductive thin wire as long as measurement accuracy is acceptable. For example, any of a contact film thickness meter, an optical non-contact film thickness meter, and a laser microscope can be preferably used. In a case where the conductive thin wire has a small thickness, it is desirable to observe a cross-section of the conductive thin wire with a scanning microscope in order to calculate the thickness of the conductive thin wire. In this case, it is desirable that an average value of thicknesses measured in a section 10 times or more larger than the average thickness is used as the thickness of the conductive thin wire.

In forming conductive thin wires by mixing and printing a conductive component and a binder, each of which has a known volume, in a case where a ratio between the volume of the conductive component and the volume of the binder is clear, the ratio may be calculated not by the above method, but using a value of the ratio between the volume of the conductive component and the volume of the binder component which has been known.

In the above description, the method of calculating the ratio (volume of conductive component/volume of binder) has been described using a case where the conductive portion has a form of conductive thin wire as an example. However, the ratio can be calculated according to the same procedure even in a case where the conductive portion has another form (for example, solid film).

In the above description, the method of calculating the ratio (volume of conductive component/volume of binder) by calculating the volume of the conductive component and the volume of the binder has been described. However, the ratio may be calculated by other methods. For example, since the volume (m$^3$/m$^2$) of the conductive thin wires per unit area can be said to be a height (m), the same ratio can be calculated by (height of conductive component)/(height of conductive thin wire-height of binder).

The method of producing the conductive thin wire (conductive portion) is not particularly limited, and a known method can be employed. Examples thereof include the following two methods.

(1) Method Using Silver Halide
(2) Method Using Paste Containing Conductive Component or Precursor Thereof and Binder Hereinafter, the two methods will be described in detail.
(Method Using Silver Halide)

The procedure of this method includes a step A of forming a predetermined silver halide-containing photosensitive layer on a support and a step B of performing an exposure and development treatment on the silver halide-containing photosensitive layer. A step C of performing a heating treatment and/or a gelatin removing step D may be optionally performed after the step B. By performing this method, a conductive thin wire (conductive portion) containing metallic silver particles is obtained.

Hereinafter, the procedures of the steps will be described in detail.

In the step A, a silver halide-containing photosensitive layer (hereinafter, also simply referred to as "photosensitive layer") forming composition containing silver halide and a binder is applied to a support to form a silver halide-containing photosensitive layer. By performing this step, a photosensitive layer containing silver halide and a binder is formed on the support.

The halogen atom contained in the silver halide may be any of a chlorine atom, a bromine atom, an iodine atom, and a fluorine atom, and these may be combined. For example, silver halide mainly based on silver chloride, silver bromide, or silver iodide is preferable, and silver halide mainly based on silver bromide or silver chloride is more preferable.

Here, for example, the "silver halide mainly based on silver bromide" refers to silver halide in which the mole fraction of bromide ion in the silver halide composition is 50% or more.

The silver halide is preferably in the form of solid particles. From the viewpoint of pattern property of the conductive thin wires to be formed after the exposure and development treatment, the average particle size of the silver halide is preferably 0.1 to 1,000 nm, more preferably 0.1 to 100 nm, and even more preferably 1 to 50 nm in terms of equivalent spherical diameter.

The equivalent spherical diameter of the silver halide particles is a diameter of particles of a spherical shape having the same volume.

Examples of the binder to be used include a resin having predetermined characteristics (gel fraction and moisture content) and a functional component. The resin may be dispersed in the form of particles in the photosensitive layer forming composition. For example, the photosensitive layer forming composition may be a latex in which the resin is dispersed in the form of particles in water. The photosensitive layer forming composition may contain benzyl alcohol or a film forming agent based on glycol or cellosolve. The film forming agent is preferably used since forming a photosensitive layer proceeds at a lower temperature, and it is possible to expect an improvement of optical characteristics (particularly, a reduction of haze value) and an improvement of adhesiveness of the photosensitive layer to the support.

The photosensitive layer forming composition may optionally contain other materials in addition to the above-described binder.

For example, the photosensitive layer forming composition may contain a solvent. Examples of the solvent include water, organic solvents (for example, alcohols, ketones, amides, sulfoxides, esters, and ethers), and mixed solvents thereof.

The content of the solvent in the photosensitive layer forming composition is not particularly limited, and preferably 30 to 90 mass %, and more preferably 50 to 80 mass % with respect to a total mass of the composition.

The photosensitive layer forming composition may contain other resins in addition to the resin having predetermined characteristics (gel fraction and moisture content). Examples of other resins include gelatin.

In Step B, first, the photosensitive layer is exposed. In the exposed portion, the silver halide forms a latent image. The exposure may be performed in a pattern. Examples thereof include a method of performing exposure via a mask having a mesh-like opening pattern in order to obtain a mesh pattern formed of conductive thin wires.

A light source to be used in exposure is not particularly limited, and examples thereof include light such as visible light and ultraviolet light and radiation such as X-ray.

After the exposure, the photosensitive layer is developed to form conductive thin wires containing metallic silver. In an unexposed area which has not been exposed to light, the silver halide dissolves and flows from the photosensitive layer during the development treatment, and a transparent film (non-conductive portion) is obtained.

The method of the development treatment is not particularly limited, and a known development treatment is performed.

After the step B, the step C of performing a heating treatment may be optionally performed on the obtained conductive film. By performing this step, the resins in the conductive thin wire are fused each other, and a more solid layer is formed.

In a case where gelatin is used as other resins described above, the gelatin removing step D may be optionally performed. The method of removing the gelatin is not particularly limited, and examples thereof include a method of treating the obtained conductive film with proteolytic enzyme to remove gelatin. In a case where the gelatin removing step D is performed, the silver halide and the gelatin contained in the unexposed portion are removed, and a non-conductive portion containing the binder is formed.

(Method Using Paste Containing Conductive Component or Precursor Thereof and Binder)

Regarding the procedure of this method, a paste containing a conductive component or a precursor thereof and a binder is applied to a predetermined position on a support, and a heating treatment is optionally performed.

The definition of the conductive component is as described above.

A precursor of the conductive component denotes a component capable of forming a conductive component with the application of energy such as a heating treatment, and examples thereof include compounds containing a metal atom such as a metal oxide and an organic metal compound. With such a compound, reduction or decomposition easily proceeds with the application of energy, and a conductive component can be formed.

Examples of the metal oxide include a gold oxide and a silver oxide. Particularly, a silver oxide is preferable since it has self-reducibility. As the organic metal compound, silver acetate and silver citrate having a relatively small molecular weight are preferable.

The resin to be used satisfies predetermined characteristics (gel fraction and moisture content).

The paste may contain a component other than the conductive component or a precursor thereof and the binder.

For example, the paste usually contains a solvent. The type of the solvent is not particularly limited, and examples thereof include alcohols and alkyl ethers.

The paste may optionally contain a reducing agent. Particularly, in a case where a precursor of a conductive component forms a conductive component by reduction, the conductive component is easily formed due to the reducing agent contained in the paste.

The viscosity of the paste can be appropriately set in accordance with the printing method or the solvent to be used, and preferably 5 to 20,000 mPa·s.

The method of applying the paste on the support is not particularly limited, and examples thereof include a gravure printing method, an offset printing method, a typographical printing method, a screen printing method, a flexographic printing method, and an ink jet printing method.

After the paste is applied on the support, the support to which the paste has been applied may be optionally subjected to a heating treatment. By performing the heating treatment, the organic component is removed, the conductive components (particularly, metal particles) adhere to each other, and the surface resistance value is reduced.

The heating temperature is, for example, preferably 50° C. to 200° C., and more preferably 70° C. to 200° C. The heating time is, for example, preferably 3 to 2,000 minutes, and more preferably 10 to 120 minute.

Figure 3:
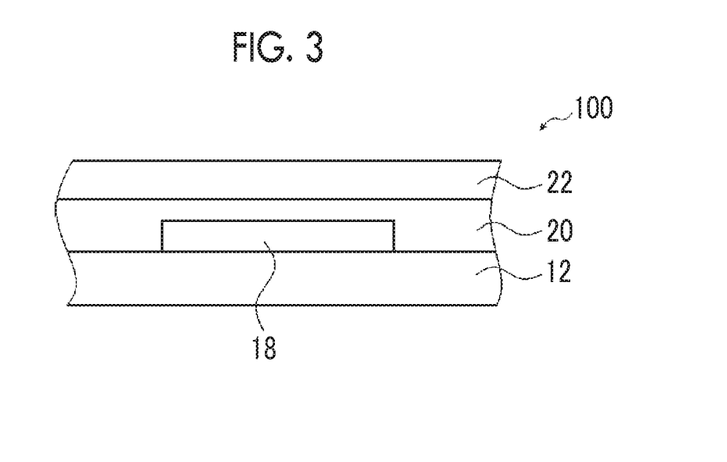
FIG. 3 is a cross-sectional view of a conductive member according to another embodiment.
Figure 4:
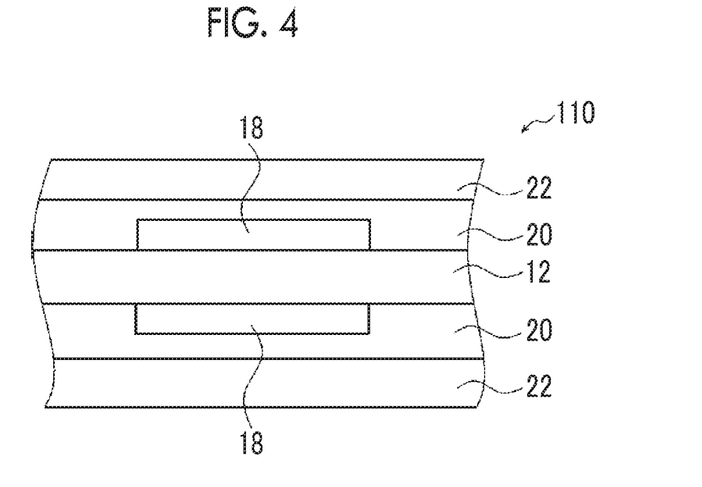
FIG. 4 is a cross-sectional view of a conductive member according to yet another embodiment.

FIG. 1 describes a form of the conductive film which has the support 12 and the conductive portion including the conductive thin wires 14, but the invention is not limited to this form. For example, there may be provided a conductive film 100 which further has a pressure sensitive adhesive layer 20 disposed on a conductive portion 18 and a protective substrate 22 disposed on the pressure sensitive adhesive layer 20 as shown in FIG. 3. In addition, there may be provided a conductive film 110 in which a conductive portion 18, a pressure sensitive adhesive layer 20, and a protective substrate 22 are disposed in this order on both surfaces of a support 12 as shown in FIG. 4. The conductive portion 18 (first conductive portion) disposed on one surface of the support 12 and the conductive portion 18 (second conductive portion) disposed on the other surface of the support are disposed to be opposed to each other in an insulating state.

The pressure sensitive adhesive layer is disposed on the conductive portion to allow the protective substrate to be described later to adhere to the support.

The configuration of the pressure sensitive adhesive layer is not particularly limited, and a known pressure sensitive adhesive layer can be used.

The method of forming the pressure sensitive adhesive layer is not particularly limited, and examples thereof include a method of applying a pressure sensitive adhesive layer forming composition on the conductive portion side of a support having a conductive portion disposed on a surface thereof to form a pressure sensitive adhesive layer, and a method of bonding a sheet-like pressure sensitive adhesive layer on the conductive portion side of a support having a conductive portion disposed on a surface thereof.

The protective substrate is disposed on the pressure sensitive adhesive layer and serves to protect the conductive portion from the external environment.

A resin substrate is preferable as the protective substrate. Examples of the material of the resin substrate include the resins exemplified in the above description of the support.

It is desirable to appropriately select the thickness of the protective substrate in accordance with each usage.

The method of forming the protective substrate is not particularly limited, and examples thereof include a method of bonding a protective substrate on a pressure sensitive adhesive layer.

[Conductive Film Having Three-Dimensional Shape and Method of Producing Conductive Film Having Three-Dimensional Shape]

The conductive film having the above-described configuration can be suitably used as a film to be subjected to forming such as bending. More specifically, the above-described conductive film can be deformed (three-dimensional deformation) to obtain a conductive film having a three-dimensional shape.

Hereinafter, a step X of deforming the conductive film to obtain a conductive film having a three-dimensional shape will be described in detail.

Figure 5:
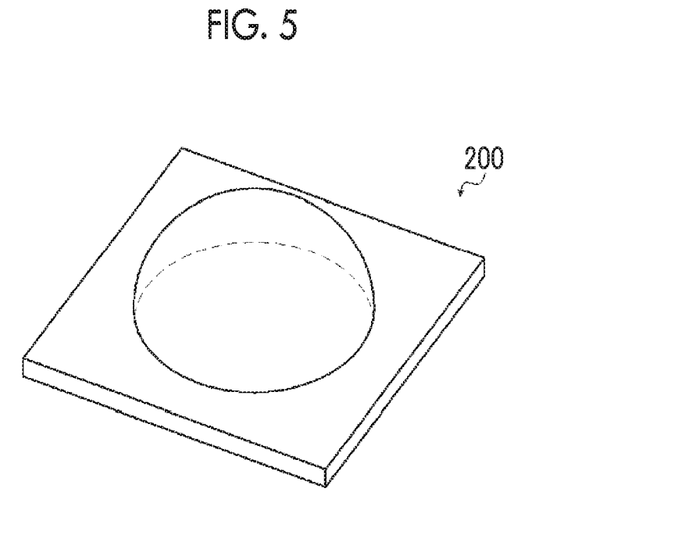
FIG. 5 is a perspective view of a conductive film having a three-dimensional shape according to an embodiment.

The step X of deforming the conductive film to obtain a conductive film having a three-dimensional shape is, for example, a step of obtaining a conductive film 200 which is hemispherically deformed as shown in FIG. 5.

FIG. 5 illustrates a hemispherical shape as an example of the three-dimensional shape, but the invention is not limited to this form. Examples of the three-dimensional shape include a three-dimensional shape including a curved surface, and more specific examples thereof include a rectangular parallelepiped shape, a button shape, a cylindrical shape, a semi-cylindrical shape, a corrugated shape, an uneven shape, and a shape obtained by combining the above shapes.

The deformation method is not particularly limited, and a known method can be employed. Examples thereof include vacuum forming, blow forming, free blow forming, pressure forming, vacuum pressure forming, and heat press forming. The deformation also includes stretching.

A known device can be used as a device for deforming the conductive film into a three-dimensional shape under specific temperature and load conditions. Examples thereof include a micro vacuum forming machine FVS-500 (manufactured by WAKISAKA ENGINEERING Co., Ltd.), a small-sized vacuum pressure forming machine FKS type (manufactured by Asano Laboratories Co., Ltd.), and a small-sized vacuum pressure forming machine NGF-0406-S type (manufactured by Fu-se Vacuum Forming Ltd.).

The conductive film may be set on a mold and subjected to injection molding to impart a three-dimensional shape.

In a case where the conductive film includes a pressure sensitive adhesive layer and a protective substrate, these are deformed together.

In deforming the conductive film, the deformation is preferably performed under a heating condition. Although depending on the type of the support, the heating condition is preferably 80° C. to 250° C., more preferably 100° C. to 220° C., and even more preferably 130° C. to 200° C.

In a case where the temperature is within the above range, the conductive film hardly melts while having excellent flexibility during deformation. The above-described temperature means a set temperature of the forming machine, that is, a temperature of the atmosphere during forming.

The amount of deformation in deforming the conductive film is not particularly limited. By setting the characteristics of the resin or the volume ratio between the binder and the conductive component within a preferable range, the disconnection of the conductive portion can be prevented even in a case where the deformation ratio is 120% or more.

Here, the deformation ratio means a ratio (%) of the shortest length of a line (a line drawn along the surface) connecting both ends in a stretching direction in which stretching is performed at the highest degree of stretching by deformation on the surface of the conductive film to the shortest length of a line (a line drawn along the surface) connecting both ends of the conductive film before forming in the corresponding direction.

In deforming the conductive film, the deformation speed is preferably 1,000 mm/min or less, more preferably 50 to 1,000 mm/min, and even more preferably 50 to 300 mm/min. Here, the deformation speed means a deformation speed in a deformation direction in which the deformation is performed at the highest deformation ratio on the surface of the conductive film. In a case where the deformation speed is within the above range, the productivity is excellent and disconnection hardly occurs in the conductive portion.

Before the step X is performed, the conductive film is preferably dried in advance to remove the moisture contained in the support. The drying method is not particularly limited, and examples thereof include a heating treatment, a drying treatment under reduced pressure (vacuum drying), and a method using a drying agent.

Especially, a step Y of heating (preheating) the conductive film at a temperature of 70° C. or higher before performing the step X is preferably performed. By performing the step Y, peeling (generation of bubbles) hardly occurs from a layer (for example, pressure sensitive adhesive layer) disposed adjacent to the conductive portion in the obtained conductive film having a three-dimensional shape. Particularly, in a case where the above-described deformation is performed in a state in which a protective substrate is laminated via the pressure sensitive adhesive layer, it is possible to prevent peeling (generation of bubbles) between the conductive film and the pressure sensitive adhesive layer and between the protective substrate and the pressure sensitive adhesive layer. It is desirable to perform the drying immediately before the step X in order to prevent the effect of the drying from disappearing due to moisture absorption after the drying.

The heating time is not particularly limited, and preferably 10 minutes or longer, and more preferably 20 minutes or longer in view of the fact that the above-described effect is further improved. The upper limit thereof is not particularly limited. In view of productivity, the upper limit is 180 minutes or shorter in many cases.

As a preferable aspect of the preheating, the heating is preferably performed for 60 minutes or longer at a heating temperature of 70° C. to 90° C. in view of prevention of peeling (generation of bubbles) during the preheating. In a case where peeling (generation of bubbles) during the preheating is acceptable, the preheating is preferably performed at a higher temperature since the heating time can be shortened.

A conductive film having a three-dimensional shape is obtained by the above-described procedure.

The conductive film having a three-dimensional shape has a support having a three-dimensional shape and a conductive portion disposed on the support and containing a conductive component and a binder, the binder contains a resin, the gel fraction of the resin is 70% or more, and the moisture content of the resin is 3% or less. That is, the conductive portion is disposed on the support along the three-dimensional shape of the support.

The three-dimensional shape is not particularly limited, and various shapes can be employed as described above. Examples thereof include three-dimensional shapes including a curved surface.

A pressure sensitive adhesive layer may be further disposed on the conductive portion in the conductive film having a three-dimensional shape. In that case, the pressure sensitive adhesive layer is disposed along the surface of the support having a three-dimensional shape. That is, the pressure sensitive adhesive layer has a three-dimensional shape corresponding to the shape of the support having a three-dimensional shape.

A protective substrate may be further disposed on the pressure sensitive adhesive layer in the conductive film having a three-dimensional shape. In that case, the protective substrate is disposed along the surface of the support having a three-dimensional shape. That is, the protective substrate has a three-dimensional shape corresponding to the shape of a support having a three-dimensional shape.

Examples of the method of obtaining a conductive film having a three-dimensional shape which has a protective substrate and a pressure sensitive adhesive layer include a method of deforming a conductive film having a protective substrate and a pressure sensitive adhesive layer.

In addition to this method, a method of sticking a lamination film having a three-dimensional shape and including a support and a conductive portion and a protective substrate having a three-dimensional shape together via a pressure sensitive adhesive layer is exemplified. In this case, a hot melt pressure sensitive adhesive is preferably used as the pressure sensitive adhesive layer, and the pressure sensitive adhesive is preferably laminated in advance on the protective substrate or the lamination film.

Examples of methods other than the above methods include a method of subjecting a lamination film which has a three-dimensional shape formed by a three dimension overlay method (TOM), hot plate forming, or the like, and includes a support and a conductive portion to covering with a protective substrate and forming. In the covering and forming, it is desirable to install a holding mold, worked into a shape along the lamination film, inside the lamination film in order to suppress the deformation of the film due to the pressure during the coating.

The variation in thickness of the support having a three-dimensional shape is not particularly limited, and in many cases, the thickness of the thinnest portion of the support is 90% or less of the thickness of the thickest portion of the support.

The method of measuring the thickness is as follows. First, thicknesses of any 20 points in the three-dimensional shape portion of the support are measured, and the maximum value (thickness of the thickest portion) and the minimum value (thickness of the thinnest portion) are selected among the values measured at the 20 points. A ratio of the minimum value to the obtained maximum value {(minimum value/maximum value)×100} is obtained.

[Stretched Film and Method of Producing Stretched Film]

The conductive film having the above-described configuration can also be suitably used as a film to be subjected to uniaxial stretching or biaxial stretching. More specifically, a stretched film can be obtained by uniaxially or biaxially stretching (stretching in a surface direction) the above-described conductive film.

The method of the uniaxial stretching or the biaxial stretching is not particularly limited, and a known method can be employed. Examples thereof include stretch forming. Examples of the device for stretching a conductive film under specific temperature and load conditions include tensile testing machines such as a TENSILON universal testing machine (manufactured by A & D Company) and a precision universal testing machine AUTOGRAPH AGS-X series (manufactured by Shimadzu Corporation).

The degree of stretching and the stretching speed during the stretching are not particularly limited. These are preferably within the ranges, respectively, described in the description of the deformation ratio and the deformation speed in producing the above-described conductive film having a three-dimensional shape.

[Usage]

The conductive film having a three-dimensional shape and the stretched film described above can be used for various purposes. For example, these are used for various electrode films (for example, electrode films for a touch panel, electrode films for an electro-luminescence (EL) element, or electrode films for a solar cell), heat generating sheets, and printed wiring boards. Especially, the conductive film having a three-dimensional shape and the stretched film are preferably used for touch sensor films, and more preferably for capacitive touch sensor films. In a case where the conductive film having a three-dimensional shape and the stretched film are used for touch sensor films, the conductive portion is used as a detection electrode and/or a lead-out wire.

For other purposes, the conductive film having a three-dimensional shape and the stretched film can also be used as an electromagnetic shield which blocks electromagnetic waves such as radio waves or microwaves (ultrahigh frequency waves) generated from a personal computer or a workstation and prevents static electricity. The conductive film having a three-dimensional shape and the stretched film can also be used as an electromagnetic shield which is used in video photographing equipment or electronic medical equipment, other than the electromagnetic shield which is used in a personal computer main body.

The conductive film having a three-dimensional shape and the stretched film can also be used as a transparent heat generator.

EXAMPLES

Hereinafter, the invention will be described in greater detail with examples of the invention. Materials, used amounts, ratios, treatment contents, treatment procedures, and the like shown in the following examples are able to be properly changed without departing from the gist of the invention. Therefore, the scope of the invention will not be restrictively interpreted by the following specific examples.

Example A-1

(Preparation of Silver Halide Emulsion)

While the following liquid 1 kept at 38° C. and pH 4.5 was stirred, 90% of each of the following liquids 2 and 3 was simultaneously added for 20 minutes to form 0.16 μm core particles. Next, to the obtained solution, the following liquids 4 and 5 were added for 8 minutes, and the remaining 10% of each of the following liquids 2 and 3 was added for 2 minutes to grow the core particles up to 0.21 μm. Thereafter, 0.15 g of potassium iodide was added to the obtained solution, the solution was aged for 5 minutes, and the particle formation was completed.

| Liquid 1: | |
|---|---|
| Water | 750 ml |
| Gelatin | 8.6 g |
| Sodium Chloride | 3 g |
| 1,3-Dimethylimidazolidine-2-thione | 20 mg |
| Sodium Benzenethiosulfonate | 10 mg |
| Citric Acid | 0.7 g |
| Liquid 2: | |
| Water | 300 ml |
| Silver Nitrate | 150 g |
| Liquid 3: | |
| Water | 300 ml |
| Sodium Chloride | 38 g |
| Potassium Bromide | 32 g |
| Potassium Hexachloroiridate (III) (0.005% KCl, 20% aqueous solution) | 5 ml |
| Ammonium Hexachlorinated Rhodiumate (0.001% NaCl, 20% aqueous solution) | 7 ml |
| Liquid 4: | |
| Water | 100 ml |
| Silver Nitrate | 50 g |

| Liquid 5: | |
|---|---|
| Water | 100 ml |
| Sodium Chloride | 13 g |
| Potassium Bromide | 11 g |
| Yellow Prussiate of Potash | 5 mg |

Then, the particles were water-washed by a flocculation method in the usual manner. Specifically, the temperature of the solution after completion of the particle formation was lowered to 35° C., and a sulfuric acid was added thereto to lower the pH of the solution until silver halide was precipitated (the pH was within a range of 3.6±0.2). Next, about 3 liters of the supernatant was removed from the obtained solution (first water washing). Next, 3 liters of distilled water was added to the solution from which the supernatant was removed, and then a sulfuric acid was added until silver halide was precipitated. 3 liters of the supernatant was removed again from the obtained solution (second water washing). The same operation as the second water washing was repeated one more time (third water washing), and the water washing and desalting step was completed. The emulsion after the water washing and desalting was adjusted to pH 6.4 and pAg 7.5, and 2.5 g of gelatin, 10 mg of sodium benzenethiosulfonate, 3 mg of sodium benzenethiosulfinate, 15 mg of sodium thiosulfate, and 10 mg of a chloroauric acid were added thereto to perform chemical sensitization at 55° C. so as to obtain the optimum sensitivity. 100 mg of 1,3,3a,7-tetraazaindene as a stabilizer and 100 mg of Proxel (trade name, manufactured by ICI Co., Ltd.) as a preservative were added to the emulsion after the chemical sensitization. The finally obtained emulsion was a silver iodochlorobromide cubic particle emulsion having an average particle diameter of 0.22 μm and a coefficient of variation of 9% and containing 0.08 mol % of silver iodide, in which a ratio of silver chloride was 70 mol % and a ratio of silver bromide was 30 mol % in silver chlorobromide.

(Preparation of Photosensitive Layer Forming Composition)

To the above-described emulsion, $1.2 \times 10^4$ mol/molAg of 1,3,3a,7-tetraazaindene, $1.2 \times 10^{-2}$ mol/molAg of hydroquinone, $3.0 \times 10^4$ mol/molAg of a citric acid, 0.90 g/molAg of 2,4-dichloro-6-hydroxy-1,3,5-triazine sodium salt, and a slight amount of a hardener were added, and the pH of the coating liquid was adjusted to 5.6 using a citric acid.

A latex (hereinafter, also referred to as "latex 1") containing particles of a polymer P-1 (corresponding to the resin of the invention) having a crosslinking structure and a dispersant was added to the coating liquid such that a ratio of the polymer P-1 to the gelatin in the coating liquid (mass ratio) was 1/1.

The latex containing the particles of the polymer P-1 was obtained by emulsion-polymerizing methyl methacrylate (52.8 parts by mass), butyl acrylate (40.1 parts by mass), hydroxyethyl methacrylate (4.1 parts by mass), an acrylic acid (2.0 parts by mass), ethylene glycol dimethacrylate (0.5 parts by mass), and 3-methacryloxypropyltrimethoxysilane (0.5 parts by mass) in the presence of a dialkyl phenyl PEO (polyethylene oxide) sulfuric acid ester as a dispersant. Among the monomers, ethylene glycol dimethacrylate (EGDMA) and 3-methacryloxypropyltrimethoxysilane (SC) are monomers (so-called crosslinking monomers) for introducing a crosslinking structure into the polymer.

In the latex, the mass ratio of the dispersant to the polymer P-1 was 2.0/100=0.02, and the solid content concentration was 47 mass %.

A vinyl sulfone crosslinking agent as a crosslinking agent for the gelatin was further added to the obtained coating liquid. The amount of the crosslinking agent to be added was adjusted such that a ratio thereof was 3 mass % with respect to the gelatin in a photosensitive material 1 to be described later.

A photosensitive layer forming composition was prepared as described above.

(Step of Producing Support with Undercoat Layer)

The following undercoat layer forming composition was applied to both surfaces of an 80 μm thick cycloolefin polymer (COP) film (glass transition temperature: 133° C.) which had been subjected to a corona treatment. Thus, a 0.05 μm thick undercoat layer was formed, and a support with an undercoat layer was produced.

(Composition of Undercoat Layer Forming Composition)

| | |
|---|---|
| Latex 1 Described Above | 55 mg/m² |
| Surfactant: RAPISOL A-90 (trade name: manufactured by NOF CORPORATION) | 1.3 mg/m² |
| Surfactant: NAROACTY CL-95 (trade name: manufactured by Sanyo Chemical Industries, Ltd.) | 0.8 mg/m² |
| Crosslinking Agent: CARBODILITE V-02-L2 (trade name: manufactured by Nisshinbo Holdings Inc.) | 10 mg/m² |
| Colloidal Silica (having a particle size of 40 to 50 nm): SNOWTEX XL (trade name: manufactured by Nissan Chemical Corporation) | 1.3 mg/m² |
| Carnauba Wax | 2.5 mg/m² |

(Photosensitive Material Forming Step)

A silver halide-free layer forming composition obtained by mixing the above-described latex 1, gelatin, and a solid dispersion of a dye having the following structure was applied on the undercoat layer on one side of the above-described support with an undercoat layer, and thus a 1.0 μm thick silver halide-free layer was provided. The mixing mass ratio of the polymer P-1 to the gelatin (polymer P-1/gelatin) was 2.5/1, and the content of the polymer P-1 was 0.88 g/m². The content of the dye was 0.08 g/m².

Next, the above-described photosensitive layer forming composition was applied on the silver halide-free layer to provide a 2.5 μm thick silver halide-containing photosensitive layer. The content of the polymer P-1 in the silver halide-containing photosensitive layer was 0.88 g/m².

Next, a protective layer forming composition obtained by mixing the above-described latex 1 and gelatin was applied on the silver halide-containing photosensitive layer, and thus a 0.15 μm thick protective layer was provided. The mixing mass ratio of the polymer P-1 to the gelatin (polymer P-1/gelatin) was 0.1/1, and the content of the polymer P-1 was 0.015 g/m.

Next, the silver halide-free layer, the silver halide-containing photosensitive layer, and the protective layer described above were sequentially produced on the other undercoat layer. The obtained portion including all of the undercoat layer, the silver halide-free layer, the silver halide-containing photosensitive layer, and the protective layer is called a photosensitive material 1.

(Exposure and Development Treatment)

A plurality of laminates produced as described above were prepared, and the laminates of the both surfaces were exposed to parallel light from a high pressure mercury lamp as a light source via a lattice-like (mesh-like) photo mask giving a conductive pattern in which conductive thin wire/non-conductive portion was 5.0 μm/215 μm. After the exposure, development was performed with the following developer. A development treatment was further performed using a fixer (trade name: N3X-R for CN16X: manufactured by FUJIFILM Corporation), and then rinsing was performed with pure water. Thereafter, the obtained substrate was dried, and thus a sample having, on each surface thereof, a mesh pattern electrode in which conductive thin wire/non-conductive portion was 5.0 μm/215 μm was obtained (see FIG. 2).

(Composition of Developer)

1 liter (L) of the developer contains the following compounds. The developer contains water other than the following compounds.

| | |
|---|---|
| Hydroquinone | 0.037 mol/L |
| N-Methylaminophenol | 0.016 mol/L |
| Sodium Metaborate | 0.140 mol/L |
| Sodium Hydroxide | 0.360 mol/L |
| Sodium Bromide | 0.031 mol/L |
| Potassium Metabisulfite | 0.187 mol/L |

(Heating Treatment)

The sample obtained as described above was left and subjected to a heating treatment for 130 seconds in a superheated vapor tank at 120° C.

(Preparation of Gelatin Decomposition Liquid)

Triethanolamine and a sulfuric acid were added to an aqueous solution (concentration of proteolytic enzyme: 0.5 mass %) of proteolytic enzyme (30 L of BIOPRASE manufactured by Nagase ChemteX Corporation), thereby adjusting the pH of the solution to be 8.5.

(Gelatin Decomposition Treatment)

The sample subjected to the (heating treatment) was dipped for 120 seconds in the aqueous solution of proteolytic enzyme (40° C.). The sample was taken out of the aqueous solution, and washed by being dipped in hot water (liquid temperature: 50° C.) for 120 seconds. In this step, it was separately confirmed that the gelatin was substantially completely decomposed and removed from the sample by protein quantification by a BCA method.

(Calendering Treatment)

A calendaring treatment was performed as follows: a jack pressure of 11.4 MPa was applied to the sample after the above-described (gelatin decomposition treatment) using a calender device having a combination of a metal roller (having a diameter of 95 mm) whose surface was mirror-finished and a resin roller (having a diameter of 95 mm), and transported at a speed of 120 mm/min.

(Heating Treatment (2))

The above-described sample after the calendering treatment was left and subjected to a heating treatment for 130 seconds in a superheated vapor tank at 120° C.

In this manner, a conductive film (sample A-1) was obtained.

[Various Evaluations]

(Gel Fraction Evaluation)

The latex 1 containing the above-described polymer P-1 and a dispersant was added dropwise to a peeling film coated with silicone such that the solid content was about 100 mg. Thereafter, the peeling film to which the latex 1 was added dropwise was vacuum-dried at 25° C. for 24 hours. It was separately confirmed that there was no change in mass even in a case where the drying time was extended, and the drying was sufficiently performed under the same conditions. The non-volatile component after the drying was peeled off from the peeling film and wrapped in a 400-mesh stainless steel wire mesh whose mass was measured in advance, and a mass Wa of the sample after the drying was obtained.

Next, the sample wrapped in the stainless steel wire mesh was left in 5 ml of ethyl acetate at 25° C. for 72 hours to extract the dissolved component. The residual component (sample) after the extraction was taken therefrom and repeatedly washed two times by adding 5 ml of ethyl acetate. Then, the washed residual component was dried at 25° C. for 24 hours. A mass of the solid content after the drying was measured, and the obtained mass was denoted by Wb. A gel fraction Rg was calculated by the following expression.

Rg=(Wb/Wa)×100

(Moisture Content Evaluation)

A sample was produced using the above-described latex 1, and the moisture content thereof was measured. Specifically, a sample produced according to the same procedure as in the method described in (gel fraction evaluation) was kept for 24 hours under an environment of a temperature of 23° C. and a relative humidity of 50% RH, and then the moisture content was measured using a Karl Fischer moisture meter (Karl Fisher moisture meter MKC-610 and moisture vaporizer ADP611 manufactured by KYOTO ELECTRONICS MANUFACTURING CO., LTD.).

(Ratio of Conductive Component to Binder)

An area ratio Sr (%) of the conductive thin wire of the sample A-1 with respect to the surface of the support was obtained by observing a line width of the mesh pattern of the sample A-1 with a digital microscope (VHX-2000 manufactured by KEYENCE CORPORATION).

Next, an average amount Wg (g/m$^2$) of the silver applied as the conductive component of the sample A-1 was measured using a scanning fluorescent X-ray analyzer (ZSX Primus II manufactured by Rigaku Corporation).

Furthermore, a film thickness Th (μm) of the conductive thin wire portion was obtained by cross-sectional observation with a scanning microscope (scanning electron microscope S-5200 manufactured by Hitachi, Ltd.)

From the obtained numerical values, a volume ratio (Vr) between the conductive component and the binder in the conductive thin wire was calculated by the following expression.

$$Vr=((Wg/\rho)/(Sr/100))(Th-((Wg/\rho)/(Sr/100)))$$

Here, ρ is a specific gravity of the conductive component, and a value of 10.5 was used as a specific gravity value of the silver.

(Stretchability Evaluation)

The sample A-1 was cut into a size of 30 mm×100 mm, and the cut sample was set in a tensile testing machine (manufactured by Shimadzu Corporation, precision universal testing machine AUTOGRAPH AGX-S) and heated to 180° C. The sample was subjected to tensile stretching in a long axis direction at a speed of 500 mm/min, and then the presence or absence of breakage of the conductive thin wire was determined by observation with a microscope. The test was performed by various changing the stretching ratio, and the stretchability was evaluated according to the following criteria.

"A": There is no broken portion in the conductive thin wire in a case where the stretching ratio is 150%.

"B": There is no broken portion in a case where the stretching ratio is less than 140%, and there is a broken portion in a case where the stretching ratio is 140% or more.

"C": There is no broken portion in a case where the stretching ratio is less than 130%, and there is a broken portion in a case where the stretching ratio is 130% or more.

"D": There is no broken portion in a case where the stretching ratio is less than 120%, and there is a broken portion in a case where the stretching ratio is 120% or more.

"E": There is no broken portion in a case where the stretching ratio is less than 110%, and there is a broken portion in a case where the stretching ratio is 110% or more.

"F": There is a broken portion in a case where the stretching ratio is less than 110%.

(Adhesiveness Evaluation)

A conductive film in which a protective substrate was laminated on the above-described sample A-1 via a pressure sensitive adhesive sheet was produced, and then subjected to vacuum pressure forming into a dome shape (see FIG. 5) by vacuum forming to produce a conductive film having a three-dimensional shape.

The obtained conductive film was left for 16 hours under conditions of a temperature of 85° C. and a relative humidity of 85% RH, and then whether the adhesiveness was maintained between the conductive thin wire and the pressure sensitive adhesive sheet was evaluated according to the following criteria.

As the pressure sensitive adhesive sheet, an optical pressure sensitive adhesive sheet (OCA) 8172, manufactured by 3M, having a thickness of about 50 μm was used, and as the protective substrate, an 80 μm thick COP film was used. After the pressure sensitive adhesive sheet and the protective substrate were laminated on the conductive film, the laminate was subjected to an autoclave treatment under conditions of 40° C., 0.5 MPa, and 20 minutes. The vacuum pressure forming was performed using a small-sized vacuum pressure forming machine FKS (manufactured by Asano Research Institute) under conditions of a film heating temperature of 170° C., a mold temperature of 100° C., and a pressure of 0.4 MPa, and the conductive film was subjected to predrying under conditions of 130° C. and 30 minutes immediately before forming.

"A": The occurrence of peeling is not recognized at the interface between the conductive thin wire and the pressure sensitive adhesive sheet.

"B": Slight peeling is recognized at the interface between the conductive thin wire and the pressure sensitive adhesive sheet.

"C": Peeling is clearly recognized at the interface between the conductive thin wire and the pressure sensitive adhesive sheet.

(Conductivity Evaluation)

A sheet resistance value Rs (Ω/□) of the sample A-1 was measured using a four-probe sheet resistance meter (LORESTA GP: manufactured by Mitsubishi Chemical Analytech Co., Ltd.). From the obtained sheet resistance value, the area ratio Sr, and the film thickness Th of the conductive thin wire portion, a volume resistivity Rv (Ω·m) of the conductive thin wire portion was obtained by the following expression.

$$Rv(\Omega\cdot m)=Rs(\Omega/\square)\times Th\times 10^{-6}(m)\times(100/Sr)$$

Regarding the conductivity of samples of examples and comparative examples to be described later, a volume resistivity was measured in the same manner as in the case of the sample A-1, and ranked according to the following criteria.

"A": Less than 0.8 times the volume resistivity of the sample A-1

"B": Equal to or greater than 0.8 times and less than 1.2 times the volume resistivity of the sample A-1

"C": Equal to or greater than 1.2 times and less than 1.5 times the volume resistivity of the sample A-1

"D": Equal to or greater than 1.5 times and less than 2.0 times the volume resistivity of the sample A-1

"E": Equal to or greater than 2.0 times the volume resistivity of the sample A-1

Comparative Example H-1

A comparative sample H-1 was produced according to the same procedure as in Example A-1, except that the following polymer C was used instead of the polymer P-1, and various evaluations were performed.

Examples A-2 to A-7

Samples A-2 to A-7 were produced according to the same procedure as in Example A-1, except that the volume ratio between the conductive particles and the binder was changed in (Photosensitive Layer Forming Step), and the same evaluations as in Example A-1 were performed.

Examples A-8 to A-12 and Comparative Example H-2

Polymers were synthesized according to the same procedure as in Example A-1, using crosslinking monomers whose types and mass ratios were described in Table 1 in polymer synthesis, and prepared as polymers D to 1, respectively. Samples A-8 to A-12 and a comparative sample H-2 were produced according to the same procedure as in Example A-1, except that the polymers were used instead of the polymer P-1, and the same evaluations were performed. The results thereof are collectively shown in Table 1.

Example A-13

A sample A-13 was produced according to the same procedure as in Example A-1, except that a latex containing the particles of the polymer P-2 was used instead of the latex containing the particles of the polymer P-1, and various evaluations were performed.

The latex containing the particles of the polymer P-2 was produced according to the same procedure as in the case of the latex 1 using, as monomers, methyl methacrylate (53.5 parts by mass), butyl methacrylate (12.2 parts by mass), ethyl methacrylate (10.2 parts by mass), hydroxyethyl methacrylate (2.1 parts by mass), methyl acrylate (4.1 parts by mass), ethyl acrylate (4.1 parts by mass), butyl acrylate (5.1 parts by mass), 2-ethylhexyl acrylate (5.1 parts by mass), an acrylic acid (1.0 part by mass), and ethylene glycol dimethacrylate (2.6 parts by mass).

Example A-14

A sample A-14 was produced according to the same procedure as in Example A-1 except that a latex containing the particles of the polymer P-3 was used instead of the latex 1, and various evaluations were performed.

The latex containing the particles of the polymer P-3 was produced according to the same procedure as in the case of the latex 1 using, as monomers, butyl acrylate (27.5 parts by mass), butyl methacrylate (31.5 parts by mass), cyclohexyl methacrylate (32.0 parts by mass), hydroxyethyl methacrylate (4.0 parts by mass), an acrylic acid (1.0 part by mass), ethylene glycol dimethacrylate (3.0 parts by mass), and 3-methacryloxypropyltrimethoxysilane (0.5 parts by mass).

Example A-15

A sample A-15 was produced according to the same procedure as in Example A-1, except that a latex containing the particles of the polymer P-4 was used instead of the latex 1, and various evaluations were performed.

The latex containing the particles of the polymer P-4 was produced according to the same procedure as in the case of the latex 1 using, as monomers, methyl methacrylate (40.0 parts by mass), butyl acrylate (40.0 parts by mass), cyclohexyl methacrylate (10.0 parts by mass), hydroxyethyl methacrylate (2.0 parts by mass), an acrylic acid (1.0 part by mass), ethylene glycol dimethacrylate (0.5 parts by mass), and 3-methacryloxypropyltrimethoxysilane (0.3 parts by mass).

Example B-1

A corona discharge treatment was performed on both surfaces of a 100 μm thick polycarbonate (Panlite D-100 manufactured by TEIJIN LIMITED) support (glass transition temperature: 150° C.), and an undercoat layer was formed on one surface of the support. Then, the following silver ink was printed in a mesh pattern by an ink jet method.

Then, a heating treatment was performed at 150° C. for 60 minutes to obtain a conductive film (sample B-1). The mesh pattern in the obtained conductive film was a lattice-like silver mesh having a line width of 30 μm and a pitch of 300 μm.

The same evaluations as in Example A-1 were performed using the sample B-1 obtained as described above and having a mesh pattern.

(Production of Silver Ink)

A silver nitrate solution was reduced based on Carey-Lea's silver sol preparation method (see M. Carey Lea, Brit. J. Photog., vol. 24, p. 297 (1877) and vol. 27, p. 279 (1880)), and a solution containing metallic silver particles was prepared. After that, a chlorauric acid solution was added to the obtained solution to prepare a solution containing silver-gold particles containing silver as a main component, and ultrafiltration was performed to remove by-product salt. The particle size of the obtained particles was approximately 10 nm as a result of electron microscopic observation. The particles as a conductive component and the latex 1 were mixed, and a silver ink was produced.

Examples B-2 and B-3

Samples B-2 and B-3 were produced according to the same procedure as in Example B-1, except that the polymer E or H was used instead of the polymer P-1, and various evaluations were performed. The results thereof are collectively shown in Table 1.

Comparative Examples H-3 and H-4

Comparative samples H-3 and H-4 were produced according to the same procedure as in Example B-1, except that the polymer C or gelatin was used instead of the polymer P-1, and various evaluations were performed. The results thereof are collectively shown in Table 1.

In the "Method" column in Table 1, a case where the conductive thin wire is formed by a method using silver halide is denoted by "Silver Salt", and a case where the conductive thin wire is formed by a method using a silver ink is denoted by "Printing".

In the "Crosslinking Structure" column, a case where the used polymer includes a crosslinking structure is denoted by "Presence", and a case where no crosslinking structure is included is denoted by "Absence".

The "Crosslinking Monomer Type" column shows the type of the crosslinking monomer in each polymer and the amount thereof used. The numerical value in the parentheses represents mass % of each monomer with respect to all the monomers. EGDMA represents ethylene glycol dimethacrylate, SC represents 3-methacryloxypropyltrimethoxysilane, and DVB represents divinylbenzene.

The "Gel Fraction" column and the "Moisture Content" column show gel fractions and moisture contents of the samples including a polymer, respectively.

TABLE 1

| Sample Name | Example/ Comparative Example | Method | Polymer Type | Gel Fraction (%) | Crosslinking Structure | Crosslinking Monomer Type (numerical value in parentheses represents mass %) |
|---|---|---|---|---|---|---|
| A-1 | Example | Silver Salt | P-1 | 95 | Presence | EGDMA (0.5%) + SC (0.5%) |
| A-2 | Example | Silver Salt | P-1 | 95 | Presence | EGDMA (0.5%) + SC (0.5%) |
| A-3 | Example | Silver Salt | P-1 | 95 | Presence | EGDMA (0.5%) + SC (0.5%) |
| A-4 | Example | Silver Salt | P-1 | 95 | Presence | EGDMA (0.5%) + SC (0.5%) |
| A-5 | Example | Silver Salt | P-1 | 95 | Presence | EGDMA (0.5%) + SC (0.5%) |
| A-6 | Example | Silver Salt | P-1 | 95 | Presence | EGDMA (0.5%) + SC (0.5%) |
| A-7 | Example | Silver Salt | P-1 | 95 | Presence | EGDMA (0.5%) + SC (0.5%) |
| H-1 | Comparative Example | Silver Salt | C | 3 | Absence | — |
| H-2 | Comparative Example | Silver Salt | D | 65 | Presence | EGDMA (0.5%) + SC (0.2%) |
| A-8 | Example | Silver Salt | E | 70 | Presence | EGDMA (1%) |
| A-9 | Example | Silver Salt | F | 75 | Presence | DVB (1%) |
| A-10 | Example | Silver Salt | G | 80 | Presence | SC (0.5%) |
| A-11 | Example | Silver Salt | H | 90 | Presence | EGDMA (0.2%) + SC (0.5%) |
| A-12 | Example | Silver Salt | I | 95 | Presence | EGDMA (0.5%) + SC (1%) |
| A-13 | Example | Silver Salt | P-2 | 78 | Presence | EGDMA (2.6%) |
| A-14 | Example | Silver Salt | P-3 | 94 | Presence | EGDMA (3.0%) + SC (0.5%) |
| A-15 | Example | Silver Salt | P-4 | 95 | Presence | EGDMA (0.5%) + SC (0.3%) |
| B-1 | Example | Printing | P-1 | 95 | Presence | EGDMA (0.5%) + SC (0.5%) |
| B-2 | Example | Printing | E | 70 | Presence | EGDMA (1%) |
| B-3 | Example | Printing | H | 90 | Presence | EGDMA (0.2%) + SC (0.5%) |
| H-3 | Comparative Example | Printing | C | 3 | Presence | — |
| H-4 | Comparative Example | Printing | Gelatin | 95 | Presence | — |

| Sample Name | Volume Ratio (conductive component/binder) | Moisture Content (%) | Evaluation | | |
|---|---|---|---|---|---|
| | | | Stretchability | Adhesiveness | Conductivity |
| A-1 | 0.6 | 0.9 | A | A | B |
| A-2 | 0.4 | 0.9 | A | A | C |
| A-3 | 0.22 | 0.9 | A | A | D |
| A-4 | 0.17 | 0.9 | A | A | E |
| A-5 | 0.9 | 0.9 | B | A | A |
| A-6 | 1.2 | 0.9 | C | A | A |
| A-7 | 1.8 | 0.9 | D | A | A |
| H-1 | 0.6 | 1.2 | F | A | B |
| H-2 | 0.6 | 1.2 | E | A | B |
| A-8 | 0.6 | 1.2 | D | A | B |
| A-9 | 0.6 | 1.2 | C | A | B |
| A-10 | 0.6 | 1.2 | B | A | B |
| A-11 | 0.6 | 1.2 | B | A | B |
| A-12 | 0.6 | 1.2 | A | A | B |
| A-13 | 0.6 | 1.0 | C | A | B |
| A-14 | 0.6 | 1.0 | A | A | B |
| A-15 | 0.6 | 0.9 | A | A | B |
| B-1 | 0.6 | 1.2 | A | A | B |
| B-2 | 0.6 | 1.2 | D | A | B |
| B-3 | 0.6 | 1.2 | B | A | B |

TABLE 1-continued

| | | | | | |
|---|---|---|---|---|---|
| H-3 | 0.6 | 1.2 | F | A | B |
| H-4 | 0.6 | 8 | A | C | B |

As is obvious from the above Table 1, the conductive film according to the embodiment of the invention was confirmed to be a conductive film suitable for three-dimensional forming and to be good in adhesiveness to a layer adjacent to the conductive portion.

(Production of Touch Sensor)

A conductive film having a touch sensor pattern on both surfaces thereof was produced in the same manner as in Example A-1, except that the exposure pattern was changed, and a sample Z was obtained.

The touch sensor pattern had a detection electrode pattern at the center and a lead-out wiring pattern connected to the detection electrode pattern at the periphery, and an end portion of the lead-out wiring pattern had a terminal portion for signal extraction.

The volume ratio between the conductive component and the binder in the conductive portion of the sample Z had a value substantially equal to that of the sample A-1.

Next, using the sample Z, a conductive film was produced in which a protective substrate was laminated via a pressure sensitive adhesive sheet. As the pressure sensitive adhesive sheet, an optical pressure sensitive adhesive sheet (OCA) 8172, manufactured by 3M, having a thickness of about 50 µm was used. As the protective substrate, a resin sheet having a thickness of about 300 µm (manufactured by MITSUBISHI GAS CHEMICAL COMPANY, INC., DF02PU) in which an easily formable hard coat layer was laminated on polycarbonate was used on the outer surface side during forming (on the outer surface side of the dome shape), and a COP film having a thickness of 80 µm was used for the opposite surface. The pressure sensitive adhesive sheet and the protective substrate were laminated except for the above-described terminal portion.

The conductive film was subjected to an autoclave treatment as in the adhesiveness evaluation, and then vacuum pressure forming was performed under the same conditions using the same dome mold as that used in the adhesiveness evaluation to produce a conductive film having a three-dimensional shape. Here, before the vacuum pressure forming, predrying was performed on the conductive film at 80° C. for 16 hours.

In the obtained conductive film having a three-dimensional shape, no disconnection of the conductive portion occurred, and as a result of the adhesiveness evaluation under the above-described conditions, no floating or peeling was recognized. Via an anisotropic conductive film (ACF), a terminal portion of the lead-out wire of the obtained conductive film having a three-dimensional shape was connected to a flexible printed circuit board (FPC) connected to a control IC, and it was confirmed that the conductive film was driven well as a touch sensor.

Some of the polymers used in the examples were subjected to storage elastic modulus evaluation and breaking elongation evaluation by the following methods.

(Storage Elastic Modulus Evaluation)

A storage elastic modulus of the polymer was measured using the sample produced using the latex 1. Specifically, the latex 1 was bar-coated on a peelable base, and the film formed on the peelable base was peeled off from the peelable base and prepared as an evaluation sample. The obtained film had a thickness of 50 µm.

The storage elastic modulus was measured using the evaluation sample obtained as described above under conditions of a tensile mode, a temperature of 50° C. to 200° C., and a measurement frequency of 1 Hz with the use of a DVA-225 viscoelasticity testing machine (manufactured by IT KEISOKU SEIGYO CO., LTD.), and a value of the storage elastic modulus at 180° C. was read.

(Breaking Elongation Evaluation)

The latex 1 was bar-coated on a peelable base, and the film formed on the peelable base was peeled off and cut from the peelable base into a rectangle having a width of 5 mm and prepared as an evaluation sample. The obtained film had a thickness of about 100 µm. Using the obtained evaluation sample, a tensile test was performed with a precision universal testing machine AUTOGRAPH AGX-S (manufactured by Shimadzu Corporation) to obtain a breaking elongation. The tensile test was performed under conditions of an interchuck distance of 50 mm, a tensile speed of 5 mm/min, and a sample temperature of 180° C.

The storage elastic moduli and the breaking elongations obtained and the stretchability evaluation results and the gel fraction results of the examples are shown in Table 2. As shown in Table 2, the stretchability, that is, the breaking resistance of the conductive thin wire was not correlated with the storage elastic modulus and the breaking elongation, and the stretchability was correlated with the gel fraction.

TABLE 2

| Sample Name | Example/ Comparative Example | Gel Fraction (%) | Stretch- ability | Poly- mer Type | Storage Elastic Modulus (MPa) | Breaking Elongation |
|---|---|---|---|---|---|---|
| A-1 | Example | 95 | A | P-1 | 0.20 | 127% |
| H-2 | Comparative Example | 65 | E | D | 0.03 | 180% |
| A-13 | Example | 78 | C | P-2 | 0.20 | 48% |
| A-14 | Example | 94 | A | P-3 | 0.44 | 23% |
| A-15 | Example | 95 | A | P-4 | 0.08 | 100% |

Another aspect is as follows.

A conductive member having a conductive portion containing a conductive component and a binder, in which the binder contains a resin, a gel fraction of the resin is 70% or more, and a moisture content of the resin is 3% or less.

The conductive member can be configured as an electrode. The conductive member may be a conductive sheet, and the conductive sheet includes a conductive film.

EXPLANATION OF REFERENCES 10, 100, 110: conductive film
12: support
14: conductive thin wire
16: opening
18: conductive portion
20: pressure sensitive adhesive layer
22: protective substrate
200: conductive film having three-dimensional shape
W: length of one side

What is claimed is:

1. A conductive film comprising:
    a support; and
    a patterned thin wire-like conductive portion which is disposed on the support and contains a conductive component and a binder,
    wherein the conductive component includes a conductive particle,
    wherein the binder contains a resin,
    a gel fraction of the resin is 70% or more, and
    a moisture content of the resin is 3% or less, and
    wherein a ratio of a volume of the conductive component to a volume of the binder in the conductive portion is 0.2 to 2.0.

2. The conductive film according to claim 1,
    wherein the resin has a crosslinking structure.

3. The conductive film according to claim 2,
    wherein the resin is an acrylic or methacrylic resin.

4. The conductive film according to claim 2,
    wherein the conductive portion is disposed on both surfaces of the support.

5. The conductive film according to claim 2,
    wherein the support has a glass transition temperature of 120° C. or higher.

6. The conductive film according to claim 1,
    wherein the resin is an acrylic or methacrylic resin.

7. The conductive film according to claim 1,
    wherein the conductive portion is disposed on both surfaces of the support.

8. The conductive film according to claim 1,
    wherein the support has a glass transition temperature of 120° C. or higher.

9. The conductive film according to claim 1,
    wherein the support contains a cyclic olefin resin.

10. The conductive film according to claim 1, further comprising:
    a pressure sensitive adhesive layer which is disposed on the conductive portion.

11. The conductive film according to claim 10, further comprising:
    a protective substrate which is disposed on the pressure sensitive adhesive layer.

12. The method of producing a conductive film having a three-dimensional shape, the method further comprising:
    a step X of deforming the conductive film according to claim 11 to obtain a conductive film having a three-dimensional shape, and
    a step Y of heating the conductive film at a temperature of 70° C. or higher before the step X.

13. A touch sensor film comprising:
    a conductive film which is obtained by the method according to claim 12.

14. A method of producing a conductive film having a three-dimensional shape, the method comprising:
    a step X of deforming the conductive film according to claim 1 to obtain a conductive film having a three-dimensional shape.

15. The method of producing a conductive film having a three-dimensional shape according to claim 14, the method further comprising:
    a step Y of heating the conductive film at a temperature of 70° C. or higher before the step X.

16. A touch sensor film comprising:
    a conductive film which is obtained by the method according to claim 14.

17. The conductive film according to claim 1,
    wherein the conductive particle includes a metal.

18. A conductive film having a three-dimensional shape comprising:
    a support having a three-dimensional shape; and
    a patterned thin wire-like conductive portion which is disposed on the support and contains a conductive component and a binder,
    wherein the conductive component includes a conductive particle,
    wherein the binder contains a resin,
    a gel fraction of the resin is 70% or more, and
    a moisture content of the resin is 3% or less, and
    wherein a ratio of a volume of the conductive component to a volume of the binder in the conductive portion is 0.2 to 2.0.

19. A touch sensor film comprising:
    the conductive film having a three-dimensional shape according to claim 18.

20. A conductive film according to claim 18,
    wherein the conductive particle includes a metal.

* * * * *